Patented Dec. 15, 1925.

1,565,503

UNITED STATES PATENT OFFICE.

CLARK T. HENDERSON AND LUDWIG ROSENSTEIN, OF SAN FRANCISCO, CALIFORNIA; SAID ROSENSTEIN ASSIGNOR TO SAID C. T. HENDERSON, OF SAN MATEO COUNTY, CALIFORNIA.

WOOD PRESERVATION.

No Drawing. Application filed June 21, 1922. Serial No. 569,922.

*To all whom it may concern:*

Be it known that we, CLARK T. HENDERSON and LUDWIG ROSENSTEIN, citizens of the United States, residing at San Francisco, in the county of San Francisco, State of California, have invented a new and useful Wood Preservation, of which the following is a specification in such full and clear terms as will enable those skilled in the art to construct and use the same.

This invention relates to a process and an emulsion for impregnating and preserving wood and to the wood product.

The preservatives which have been used heretofore for the impregnation and preservation of wood have been either of an oily nature, such as creosote oil, or aqueous solutions of toxic salts, such as zinc chloride or sodium fluoride.

Substantially all materials having a toxic effect on the micro-organisms which cause rot in wood are soluble in water to some extent. Where aqueous solutions of a toxic salt, such as zinc chloride, for example, are used, the permanency of resistance to rot is impaired when the material is exposed to rainfall or submerged in water for the reason that such exposure causes the preservative to be dissolved out of the wood.

If the wood is to be used in an arid country, this leaching action will be very slow and preservation by means of aqueous solutions will be found sufficient, but if the wood is exposed to heavy rainfall or submerged in water, an oily or water repellent preservative is preferable, and for this reason a preservative combining toxic and water-proofing qualities will be more permanent in its effect than wholly water soluble compounds and is, therefore, preferable under many conditions.

Oils combining water-proofing and toxic properties, of which creosote is a notable example, are expensive, and the toxic portions of such oils are the most volatile fractions thereof, consequently disappearing in time through evaporation, leaving the treated wood again susceptible to the action of those micro-organisms which cause the wood to rot.

Non-toxic oils are cheaper than those having toxic properties; the non-toxic oils have better water-proofing qualities, they contain less volatile material, and upon drying they leave a heavier non-soluble residue. Asphalt base mineral oil is an example of an oil of this character.

Broadly, the object of this invention is to provide for the preservation of wood and similar porous materials by impregnation with a weather proof and substantially water proof material containing a non-volatile toxic substance which resists decay.

Specifically, its object is to provide means and material for treating, under pressure, such substances by impregnating them with a water repellent fluid made into a stable emulsion with a non-volatile toxic substance. The essence of such procedure is that the treated material on exposure to the action of the weather, rainfall, or even submergence in water, will give up the toxic salt with which it has been impregnated at a minimum rate. An impregnating emulsion of the character specified can be produced with an asphalt base mineral oil in combination with a material such as zinc chloride, sodium fluoride, or similar toxic material.

While asphalt base mineral oil has been specified, and while that fraction of asphalt base mineral oil commonly known as "fuel oil" is generally preferred, it is contemplated that any suitably cheap water repellent material capable of emulsifying with the toxic substances may be used to effect the desired results.

Specifically, paraffine base oils, coal tar or gas tar may be substituted for the preferred oil mentioned and zinc chloride, sodium fluoride, mercuric chloride or other toxic salts of similar character may be used.

A suitable emulsion for the carrying out of our process can be made of asphalt base mineral oil and zinc chloride; for example, by first bringing the zinc chloride into a concentrated aqueous solution containing about 70% zinc chloride and 30% water, and then stirring it with a common form of stirring apparatus into the oil to which an emulsifying agent, such as naphthene-sulphonic acid has been added suitable proportions being about 10 parts by weight of the zinc chloride solution, 85 parts by weight of the oil and 5 parts by weight of the emulsifying agent.

It will be obvious to those skilled in the chemical art that other emulsifiers, such as other organic sulphonic acids, their esters, or organic sulphochlorides can be substituted as emulsifying agents without departing from the spirit of this invention.

The principle involved is that the emulsifying agent should be somewhat soluble in both aqueous solutions and in the oil used, and it must have the effect of tending to equalize the surface tensions of the oil and solutions with respect to each other.

A further advantage to the type of emulsion referred to above lies in its homogenous toxicity, and in the fact that it can be made without the use of a high pressure homogenizer.

While experiments have shown that an emulsion containing as high as 60% zinc chloride may be produced, smaller percentages of zinc chloride are sufficient for preservation purposes as will be explained later.

It may be desirable, however, to manufacture and ship such an emulsion containing a high percentage of toxic salt, modifying this emulsion by the addition of further oil at point of usage until the percentage of toxic content has been reduced to that desired for preservation purposes. Such procedure may in certain cases effect a substantial reduction in the cost of the material by minimizing transportation charges.

Experience shows that from .4 to .5 of a pound of zinc chloride per cu. ft. of railroad tie is sufficient for complete preservation so long as the material remains therein, and a tie so treated rots only after the zinc chloride has been leached out. Bearing this in mind, we preferably use in our process an emulsion in which the zinc chloride and oil are in such proportions that when the wood has been saturated to approximate refusal, under pressure, with emulsion, the zinc chloride content of the tie will be between .3 to .5 of a pound per cu. ft. of wood.

Since the leaching of zinc chloride from wood treated with our material and process is greatly retarded, if not entirely prevented, data collected in the future may indicate the possibility of reducing the quantity of zinc chloride per cu. ft. now believed necessary without sacrificing the life of the treated wood.

It will be understood by those skilled in the art that an emulsion, such as has been mentioned, is quite different from the mere mechanical mixtures maintained in a more or less homogeneous agitation, and which are sometimes erroneously described as emulsions. Such mechanical mixtures will not accomplish the object sought herein.

The process preferably employed for introducing this impregnating compound into the wood consists in first heating the wood to a temperature in excess of 180 degrees F. but not greater than 240 degrees F. above which temperature the fibres of the wood might be injured. When the wood has been heated, it is subjected to a vacuum for the purpose of removing substantially all the moisture, and it is then immersed in an emulsion which has been previously raised to a temperature of from 170 to 200 degrees F. This preheated emulsion is then forced into the wood under such pressure as may be necessary to cause thorough penetration.

After the wood has been treated to such an extent as to refuse to take up any more of the emulsion, the remaining emulsion is drained off and used for succeeding treatment. It will be obvious to those skilled in the art that the so-called "empty cell process" can likewise be employed for treating wood with this emulsion, in fact it can be employed as a substitute for creosote in any process.

What we claim is as follows, but modifications may be made in the above particularly described form of the invention within the purview thereof:

1. An emulsion for wood preservation which consists of about 85% of a water repellent, water insoluble fluid permanently mixed with about 10% of a toxic inorganic salt in an aqueous solution, and about 5% of an emulsifying organic agent.

2. An emulsion for wood preservation which consists of about 85% of an asphalt base oil, about 10% of a toxic inorganic salt in an aqueous solution and about 5% of naphthene-sulphonic acid to cause the emulsification of the oil with said aqueous solution.

3. An emulsion for wood preservation which consists of about 85% of an asphalt base mineral oil, about 10% of a toxic salt in an aqueous solution, and about 5% of a sulphonic acid mixed to complete the emulsification.

4. As an article of commerce an emulsion of a water repellent material with an aqueous solution of a toxic salt adapted to dilution with oil for wood preservation and about 5% of a sulphonic acid to effect the emulsification.

5. As an article of commerce an emulsion of oil with an aqueous solution with a toxic inorganic salt adapted to dilution with oil for wood preservation and about 5% of a sulphonic acid to effect the emulsification.

6. As an article of commerce an emulsion of heavy asphalt oil with an aqueous solution of a toxic inorganic salt adapted to be diluted with oil for wood preservation and about 5% of a sulphonic acid to effect the emulsification.

7. As a new product wood impregnated with an emulsion of an aqueous preserving agent in an oily preserving agent.

8. Process of preserving wood which comprises impregnating the same an oily preserving agent which contains as the dispersed phrase an aqueous preserving agent emulsified into it.

9. As a new wood impregnating agent an emulsion of an aqueous wood preserving agent in an oily wood preserving agent.

10. An article of commerce consisting of a heavy asphaltic water emulsion with a toxic inorganic material mixed therewith.

11. An article of commerce consisting of a heavy asphaltic compound, an agent mixed therewith and effecting the emulsification thereof with water and a toxic material intimately mixed therewith.

12. As a new wood impregnating agent an emulsion of an aqueous solution of a toxic inorganic salt in an asphalt base mineral oil.

13. As a new wood impregnating agent an emulsion capable of being diluted with oil but immiscible with water comprising an oily wood preserving agent, an aqueous wood preserving agent and an emulsifying agent.

14. Process of preserving wood which comprises impregnating the same with an emulsion of an aqueous solution of a toxic inorganic salt in an asphalt base mineral oil.

15. Process of preserving wood which comprises impregnating the same with an emulsion capable of being diluted with oil but immiscible with water, comprising an oily wood preserving agent as an emulsifying agent.

16. As a new product wood impregnated with an emulsion of an aqueous solution of a toxic inorganic salt in an asphalt base mineral oil.

In testimony whereof we have hereunto set our hands this 16th day of June A. D. 1922.

LUDWIG ROSENSTEIN.
CLARK T. HENDERSON.